(12) United States Patent  (10) Patent No.: US 8,343,352 B2
Dagesse  (45) Date of Patent: Jan. 1, 2013

(54) METHOD FOR COLLECTING OR CONTAINING AN OIL SPILL

(75) Inventor: Paul Dagesse, Beaverlodge (CA)

(73) Assignee: Paul Dagesse, Beaverlodge, Alberta (CA)

( * ) Notice: Subject to any disclaimer, the term of this patent is extended or adjusted under 35 U.S.C. 154(b) by 436 days.

(21) Appl. No.: 12/783,816

(22) Filed: May 20, 2010

(65) Prior Publication Data

US 2010/0320151 A1    Dec. 23, 2010

Related U.S. Application Data

(60) Provisional application No. 61/219,046, filed on Jun. 22, 2009.

(51) Int. Cl.
*C02F 1/42* (2006.01)
(52) U.S. Cl. ......... 210/660; 210/671; 210/693; 210/924
(58) Field of Classification Search .................. 210/660, 210/671, 693, 924
See application file for complete search history.

(56) References Cited

U.S. PATENT DOCUMENTS 6,143,172 A    11/2000 Rink
2006/0185787 A1*   8/2006 Yu ................................. 156/227

FOREIGN PATENT DOCUMENTS

CA    2418051    2/2003

* cited by examiner

*Primary Examiner* — Chester Barry
(74) *Attorney, Agent, or Firm* — Wong, Cabello, Lutsch, Rutherford & Brucculeri, LLP

(57) ABSTRACT

Oil in an oil spill is collected by laying an elongate generally flat mat onto and around the spill where the mat is formed from strips of material arranged side by side and connected at spaced positions longitudinally to define a honeycomb structure with top and bottom surfaces of the mat defined by edges of the strips. The mat is unrolled from a supply and laid onto the surface of a body of water in which the spill has occurred so that open empty tubular cells stand upwardly from the surface allowing the oil to be absorbed into the cells. The oil can be squeezed out by pressing the strips together to close the cells.

11 Claims, 3 Drawing Sheets

METHOD FOR COLLECTING OR CONTAINING AN OIL SPILL

This application claims the benefit under 35 U.S.C. 119 of Provisional Application Ser. No. 61/219,046 filed Jun. 22, 2009.

This invention relates to a method for collecting and/or containing oil from an oil spill

BACKGROUND OF THE INVENTION

Many proposals have been made to collect and contain oil from a body of water in an oil spill.

U.S. Pat. No. 6,143,172 shows the use of polymer filled sacks which are dumped into an oil spill to soak up the oil for recovery.

Canadian application no: 2,418,051 shows a strip of material made up of flax which is laid out in a spill to contain the spill and absorb the oil.

SUMMARY OF THE INVENTION

According to the invention there is provided a method of collecting and/or containing oil in an oil spill comprising:

providing an absorbent mat formed from strips of material arranged side by side and connected at spaced positions longitudinally of the strips so that each strip is connected to a next adjacent strip on one side at first spaced positions and to a next adjacent strip on an opposed side at second spaced positions which are arranged alternately to the first spaced positions so as to form a honeycomb structure with top and bottom surfaces of the mat defined by edges of the strips;

the mat therefore having tubular cells extending between the top and bottom surfaces of the mat defined between edges of the strips placing the mat on or around oil from an oil spill with one of the surfaces of the mat flat on the oil spill and the cells at right angles to the oil spill;

and absorbing the oil into the cells.

Preferably the cells are substantially empty prior to absorption of the oil. However some absorbent material may be employed.

Preferably the mat is formed wholly by the strips. However it may include a top covering sheet or other structure to support the cells.

Preferably the cells are open at the top and bottom.

Preferably the mat is elongate and unrolled from a supply roll and laid around a periphery of the oil spill. However individual mats can also be used.

Preferably the strips are formed of a non-woven fibrous material such as a spun bond fibrous plastics material.

Preferably the strips are porous.

Preferably the strips are connected together to form the honeycomb structure by heat bonding.

Preferably the oil is extracted from the mat by squeezing the mat so as to press the strips together in a direction to flatten and close the cells to expel the oil.

Preferably the mat is placed with the surfaces flat on the oil spill and the cells at right angles to the oil spill.

Preferably the walls are connected each to the next to form the honeycomb panel by a heat seal. However adhesive connection may be used.

Preferably the mat is supplied in an initial condition with the strips flattened each to the next and is expanded from the initial condition to open the cells prior to or as the mat is laid onto the spill.

While the term "honeycomb" is used generally and in this document it will be appreciated that the tubular cells formed are generally not accurately hexagonal in cross section, particularly where, as described herein, the cells are formed from a porous fibrous material without any stiffening material such as resin which would act to maintain a regular shape of the cells.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
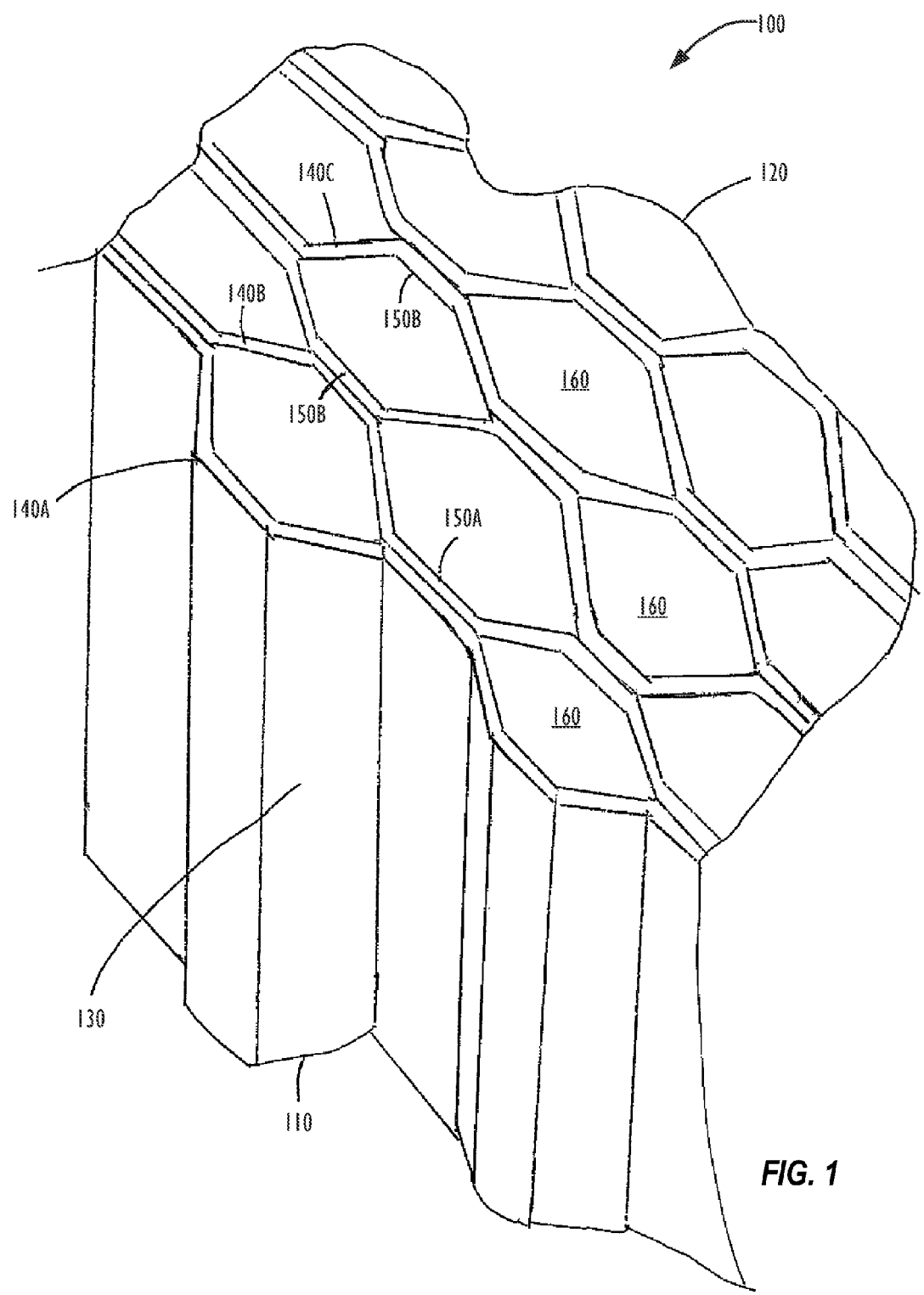
FIG. 1 is an isometric view of a mat to be used in the present invention.
Figure 2:
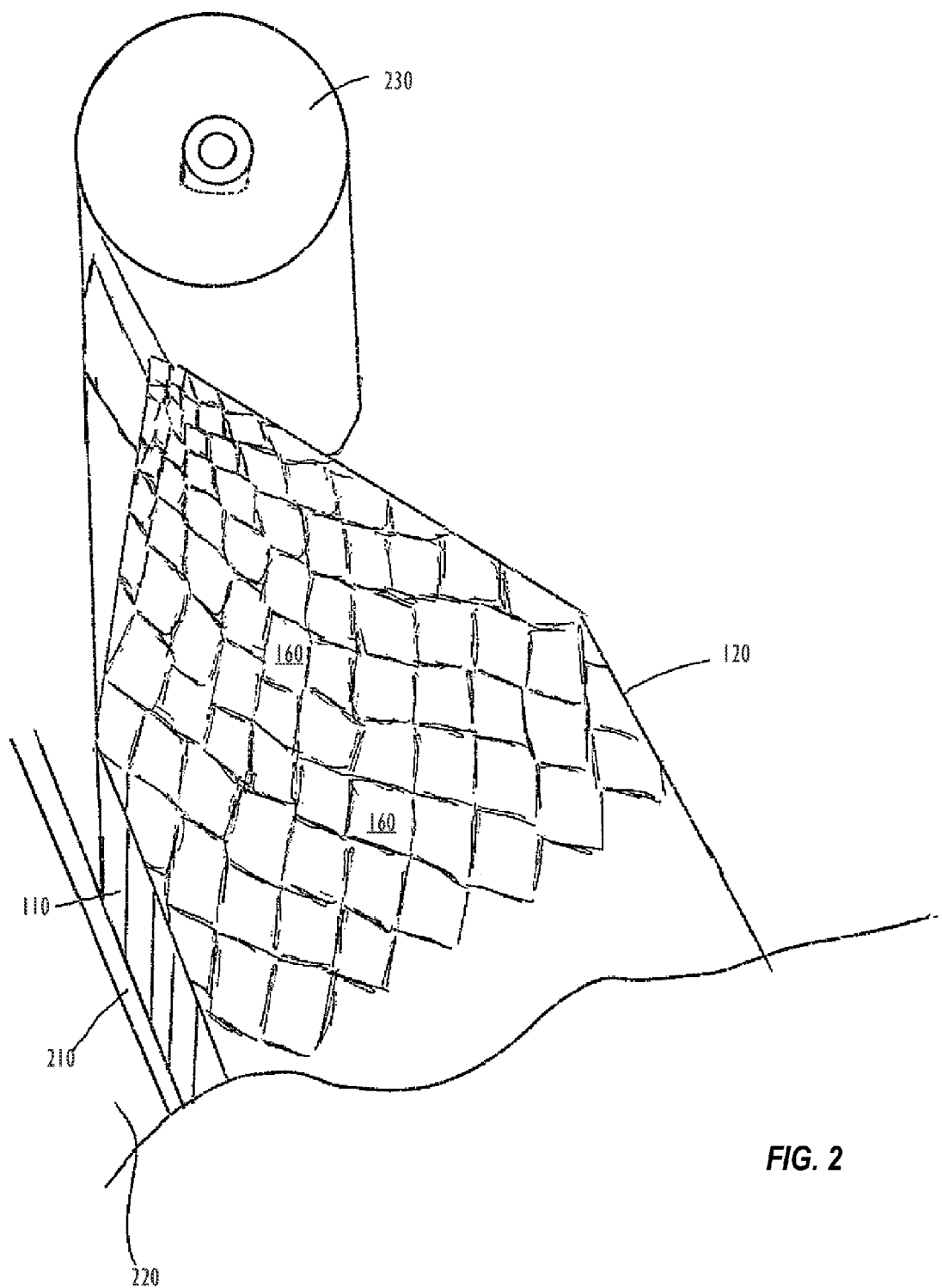
FIG. 2 is a schematic illustration of the mat of FIG. 1 being unrolled and expanded from a supply and laid over a spill.

The mat described in general above is shown in FIGS. 1 and 2 and is formed by a honeycomb core panel 100 having a first face 110 and a second opposite face 120 with an array of generally hexagonal tubular cells 160 defined by walls 130 of the core panel 100 extending between the first and second faces 110, 120. The cells 160 are defined by rows of strips 140A, 140B, and 140C arranged side by side formed of a porous fibrous material which is heat sealed at a sealing lines 150A, 150B to define the generally hexagonal cells 160.

More particularly the strips of material 140A, 140B, 140C, etc. arranged side by side are connected at spaced positions 150A, 150B longitudinally of the strips so that each strip 140B is connected to a next adjacent strip 140A on one side at first spaced positions 150A and to a next adjacent strip 140C on an opposed side at second spaced positions 150B which are arranged alternately to the first spaced positions 150A so as to form a honeycomb structure with top and bottom surfaces 110 and 120 of the mat defined by edges of the strips.

The cells are empty or substantially empty so that the oil is collected by entering into the cells to be retained thereby. However there may be provided an absorption agent within the cells. The mat is formed wholly by the strips, that is, there is no top or bottom sheet closing the cells so that they are open to allow entry of material to be collected from top and bottom.

The strips are formed of a non-woven fibrous material such as a spun bond fibrous plastics material so that the strips are porous.

The strips 140A, 140B, 140C are connected together at connections 150A and 150B preferably by heat bonding since this does not affect the properties of the product at the connection line and particularly leaves the product flexible and compressible.

The mat so formed can be in the order of 4 feet to 8 feet wide with a length which can be 30 feet or longer. The cells 160 when stretched out by separating the strips 140A, 140B, 140C typically can have a diameter (or transverse dimension) of the order of 2 inch to 6 inches and a depth, that is, the width of the strips which is typically ½ inch to 6 inches.

In use, the mat so formed is rolled into a roll 230 by compressing the cells 160 so that the strips 140A, 140B, 140C lie flat and compressed together. The mat is placed on or around a body of oil from an oil spill 210 which typically is spilled on a body of water 220. The mat can thus form a containment band around the oil 210 on the body of water 220 acting to prevent or inhibit its dispersion. The surface 110, defined by the edges of the strips 140A, 140B, 140C, lies flat on the oil spill 210 and the cells 160 at right angles to the oil spill 210. This causes oil to be absorbed into the cells 160. Thus the mat is unrolled from the supply roll 230 as shown in FIG. 2 and laid around a periphery of the oil spill 210.

Figure 3:
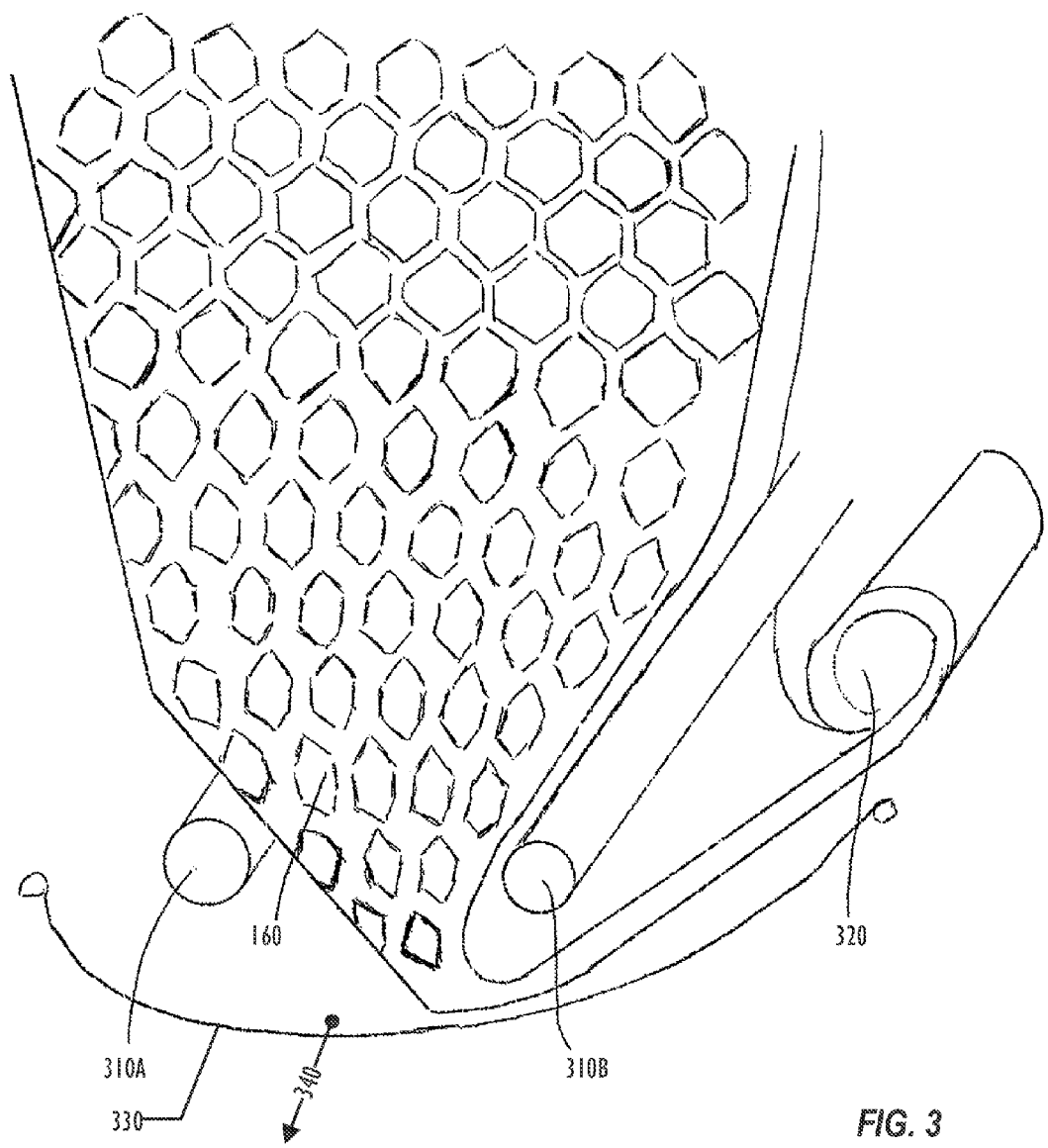
FIG. 3 is a schematic illustration of the mat of FIG. 1 being collected and squeezed to expel the collected oil.

Subsequently as shown in FIG. 3, the mat is pulled from the spill 210 and oil is extracted from the mat by squeezing the mat so as to press the strips 140A, 140B, 140C together in a direction to flatten and close the cells 160 to expel the oil. The mat is passed between compression rollers 310A, 310B which form the mat back into the flat condition into a roll 320. The oil is collected as it is squeezed out in a suitable catchment tray 330 and suitably collected as indicated by the arrow 340.

While the mat remains in place, it acts as a band around the spill so can contain the spill without the spill passing beyond the mat due to the absorption of any oil which reaches the mat into the cells of the mat.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of collecting and/or containing oil in an oil spill comprising:
    providing an absorbent mat formed from side by side strips of material arranged side by side and connected at spaced positions longitudinally of the strips so that each strip is connected to a next adjacent strip on one side at first spaced positions and to a next adjacent strip on an opposed side at second spaced positions which are arranged alternately to the first spaced positions so as to form a honeycomb structure with top and bottom surfaces of the mat defined by edges of the strips;
    the mat therefore having tubular cells extending between the top and bottom surfaces of the mat defined between edges of the strips
    placing the mat on or around oil from an oil spill with one of the surfaces of the mat flat on the oil spill and the cells at right angles to the oil spill;
    and absorbing the oil into the cells.

2. The method according to claim 1 wherein the cells are empty or substantially empty prior to absorption of the oil.

3. The method according to claim 1 wherein the mat is formed wholly by the strips.

4. The method according to claim 1 wherein the cells are open at the top and bottom.

5. The method according to claim 1 wherein the mat is elongate and unrolled from a supply roll and laid around a periphery of the oil spill.

6. The method according to claim 1 wherein the strips are formed of a non-woven fibrous material.

7. The method according to claim 1 wherein the strips are formed of a spun bond fibrous plastics material.

8. The method according to claim 1 wherein the strips are porous.

9. The method according to claim 1 wherein the strips are connected together by heat bonding.

10. The method according to claim 1 wherein the oil is extracted from the mat by squeezing the mat so as to press the strips together in a direction to flatten and close the cells to expel the oil.

11. The method according to claim 1 wherein the mat is supplied in an initial condition with the strips flattened each to the next and is expanded from the initial condition to open the cells.

\* \* \* \* \*